(12) United States Patent
Burkhardt et al.

(10) Patent No.: US 8,256,989 B2
(45) Date of Patent: Sep. 4, 2012

(54) WATER-STORAGE AND WATER-PURIFICATION SYSTEM

(75) Inventors: Holger Burkhardt, Waldshut-Tiengen (DE); Arthur Glanzmann, Lucerne (CH)

(73) Assignee: Luxin (Green Planet) AG, Luzern (CH)

( * ) Notice: Subject to any disclaimer, the term of this patent is extended or adjusted under 35 U.S.C. 154(b) by 0 days.

(21) Appl. No.: 12/979,238

(22) Filed: Dec. 27, 2010

(65) Prior Publication Data

US 2011/0188933 A1   Aug. 4, 2011

Related U.S. Application Data

(63) Continuation-in-part of application No. 12/740,342, filed as application No. PCT/EP2008/009461 on Nov. 10, 2008.

(30) Foreign Application Priority Data

Nov. 9, 2007  (EP) ..................................... 07120361

(51) Int. Cl.
*E02B 11/00* (2006.01)
*C02F 1/00* (2006.01)

(52) U.S. Cl. ................ 405/36; 405/37; 405/38; 405/41; 210/170.01

(58) Field of Classification Search ............. 405/36–41, 405/43–50, 53, 55; 210/150, 151, 170.03, 210/170.07, 170.08
See application file for complete search history.

(56) References Cited

U.S. PATENT DOCUMENTS

| | | | |
|---|---|---|---|
| 3,849,991 A * | 11/1974 | Niederwemmer | 405/38 |
| 5,337,516 A * | 8/1994 | Hondulas | 47/65 |
| 6,582,771 B1 | 6/2003 | Markusch | |
| 2002/0179511 A1 * | 12/2002 | Wofford | 210/151 |
| 2003/0116488 A1 * | 6/2003 | Cameron | 210/150 |
| 2006/0127183 A1 * | 6/2006 | Bishop | 405/37 |
| 2008/0041773 A1 * | 2/2008 | Morse | 210/96.1 |

FOREIGN PATENT DOCUMENTS

| | | |
|---|---|---|
| DE | 41 12 802 C1 | 11/1992 |
| DE | 43 39 905 C1 | 11/1994 |
| EP | 1 245 537 A2 | 10/2002 |
| GB | 2 375 761 A | 11/2002 |
| WO | 01/77032 A1 | 10/2001 |
| WO | 2006/058441 A1 | 6/2006 |

OTHER PUBLICATIONS

International Preliminary Report on Patentability, mailed Feb. 9, 2010, issued in corresponding International Application No. PCT/EP2008/009461, filed Nov. 10, 2008.

International Search Report, mailed Apr. 22, 2009, issued in corresponding International Application No. PCT/EP2008/009461, filed Nov. 10, 2008.

* cited by examiner

*Primary Examiner* — Sunil Singh
*Assistant Examiner* — Kyle Armstrong
(74) *Attorney, Agent, or Firm* — Christensen O'Connor Johnson Kindness PLLC

(57) ABSTRACT

The present invention relates to a water-storing and water-cleaning system. Said system is designed in such a manner that it can be used irrespective of location. It is used, inter alia, in agriculture, in horticulture and in reforestation. Said system comprises a reservoir (2) that is filled with a porous material (3), into which the water is seeped. In order to displace the seepage path, the reservoir (2) contains at least one barrier layer (5) made of a water-impermeable material, that separates the two layers made of the porous material (3) and comprises an outlet (6) for connecting the layers.

38 Claims, 6 Drawing Sheets

WATER-STORAGE AND WATER-PURIFICATION SYSTEM

FIELD OF THE INVENTION

The present invention relates to a water-storage and water-purification system. The present invention in particular relates to a water-storage system, which can be used for irrigation and watering of fields, meadows and especially golf courses. The present invention further relates to an irrigation system or network comprising several water-storage systems.

BACKGROUND OF THE INVENTION

Water is a precious commodity and is becoming ever more valuable by reason of the rise in world population and the increased demand for food caused by this. Supplying clean water to people is a huge logistical problem faced not only by developing nations. Only 3% of the world's water supply is available as drinking water. The shortage of water can develop into a water crisis above all in countries with low precipitation. The creation of new living spaces is prevented in many locations by reason of a prevailing water shortage. For example, the urbanisation of desert or steppe regions is extremely problematic on account of the shortage of water. From an economic point of view, water conservation and water storage is even encouraged in areas with higher precipitation. Water reservoirs and underground water collecting containers are known as arguably the simplest hydrological systems for water storage. In order to tackle the water shortage problem, there is a demand for specially adapted technologies for water treatment and water storage.

U.S. Pat. No. 6,120,210 B1 describes a method for the storage and transportation of water, e.g. rainwater, wherein water is guided under a hydrological potential through porous material of a natural channel, e.g. a river valley, and is then supplied to the end user.

Furthermore, WO 2005/123597 A1 discloses an aquitransistor which contains a multiplicity of perforated pipelines which are embedded in a matrix of porous materials. For filtering and storage purposes, water is guided with a hydrodynamic potential through the porous material of the aquitransistor before it flows into the perforated pipelines from where it is siphoned off by a pump device.

The known water-purification and/or water-storage methods and devices have the disadvantage that they cannot be used independently of the geographical conditions and/or soil conditions at that location. For example, water losses or losses in quality can occur. In order to improve the quality of the purified water, an additional water purification procedure is often required which in turn is very cost-intensive.

Apart from drinking water, a huge amount of water is also used for irrigation, watering or landscaping. For example, fields, meadows, golf courses or parks are typical landscapes, which require irrigation.

In the current state of art, a large part of the water, which is used for irrigation or watering, is wasted. Although new devices have been developed, e.g. drip-irrigation networks, the water wetting the soil is normally evaporated very rapidly, i.e. in a matter of days, since interstitial capillary forces of the soil draw the water up near to the surface, where the evaporation is intensified.

Another big disadvantage of current state of the art irrigation systems is their high installation and maintenance cost. Especially for the design of golf courses, which have to be heavily watered, the installation of appropriate irrigation systems is very costly. Moreover, since golf courses should be functional, but also aim to fulfil requirements of ecologic landscaping and the protection of the environment, integrating irrigation systems into the landscape is a challenge.

Specific problems of irrigation of golf course, which cause large costs, are water costs, fertilizer cost, pesticide costs, the amount of managed turf or the amount of watered turf. If a more efficient watering of golf courses could be realized, the above mentioned problems could be overcome, and costs could be saved.

OBJECT OF THE INVENTION

The object of the present invention can be viewed as providing a water storage and water purification system which can be used independently of location.

It can also be viewed as an object to provide a water storage and water purification system, by means of which water can be purified to a very high level of quality in a particularly cost-effective manner.

It can be further viewed as an object to provide a water storage and water purification system, by means of which water can be obtained in different stages of purification for different needs.

It can be further viewed as an object to provide an efficient water management system for irrigation, in particular for golf courses.

It can be further viewed as an object to provide a water management system, in particular for golf courses, which provides a balanced groundwater table, is cost-effective and environment-friendly.

The objects are achieved by the features of claims 1 and 24.

SUMMARY OF THE INVENTION

The invention relates to a water-storage and water-purification system, comprising: a reservoir which is filled at least partially with a porous material, characterised by: (i) at least one barrier layer to extend the seepage path of the water, wherein the barrier layer is disposed within the substantially water-impermeable, artificial and outwardly delimited reservoir, the barrier layer is provided with at least one passage for water and porous material is located above and below the barrier layer; and (ii) a water collecting container which extends from the bottom of the reservoir at least to the surface thereof, wherein the water collecting container comprises an opening above the uppermost barrier layer and comprises at least one opening underneath the lowermost barrier layer, through which openings water can flow.

The substantially water-impermeable, artificial and outwardly delimited reservoir ensures that where possible no water which is to be purified and stored is able to seep into deeper-lying, porous layers with high capillarity and thus is no longer available to the system.

The reservoir also ensures that where possible no water which is e.g. contaminated and/or polluted with contaminants is able to diffuse into the system in accordance with the invention. This serves to ensure the high quality of the water within the system.

Moreover, the use of at least one barrier layer ensures that the seepage path of the water through the porous material is extended and water can thus be kept (stored) significantly longer underground. The system in accordance with the invention does not have to be formed particularly deeply which makes it cost-effective to produce and maintain. For example, it is also feasible to utilise closed opencast pits, mines or other already existing collieries for the system or to dispose the system underneath a swimming pool.

The subordinate claims 2 to 23 relate to preferred embodiments of the system in accordance with the invention.

The invention also relates to a water-storage and water-purification system, comprising: a reservoir which is filled at least partially with porous material, characterised by: a water collecting container which extends from the bottom of the reservoir at least to the surface thereof, wherein the water collecting container comprises an opening in the upper region and at least one opening in the lower region, through which openings water can flow; and the reservoir which is substantially water-impermeable, artificial and outwardly delimited.

Against expectation, it has been shown that this system can be used for water treatment and water purification independently of location, i.e. independently of the geographical conditions and/or soil conditions at that location. The use of porous material in a substantially water-impermeable, artificial, outwardly delimited, insulated reservoir also permits the purification of water with a high degree of quality and permits the storage of water without any loss of water where possible.

The subordinate claims 25 to 35 relate to preferred embodiments of the system in accordance with the invention.

Finally, the invention relates to the use of the water-storage and water-purification system in accordance with at least one of claims 1 to 23 and of the system in accordance with at least one of claims 24 to 35 for agricultural and forestry applications, such as e.g. intensive horticulture, re-cultivation of soils or for reforestation.

FIGURES

The invention is described in greater detail hereinafter with reference to several embodiments which are illustrated in the accompanying Figures, in which:

FIG. 1 shows an inventive water-storage and water-purification system having a barrier layer, FIG. 2 shows an inventive water-storage and water-purification system having three barrier layers, FIG. 3 shows an inventive water-storage and water-purification system having three barrier layers for utilised agricultural areas, FIG. 4 shows an inventive water-storage and water-purification system having various porous layers for intensive horticulture.

DETAILED DESCRIPTION OF THE INVENTION

The present invention relates to a water-storage and water-purification system.

Figure 1:
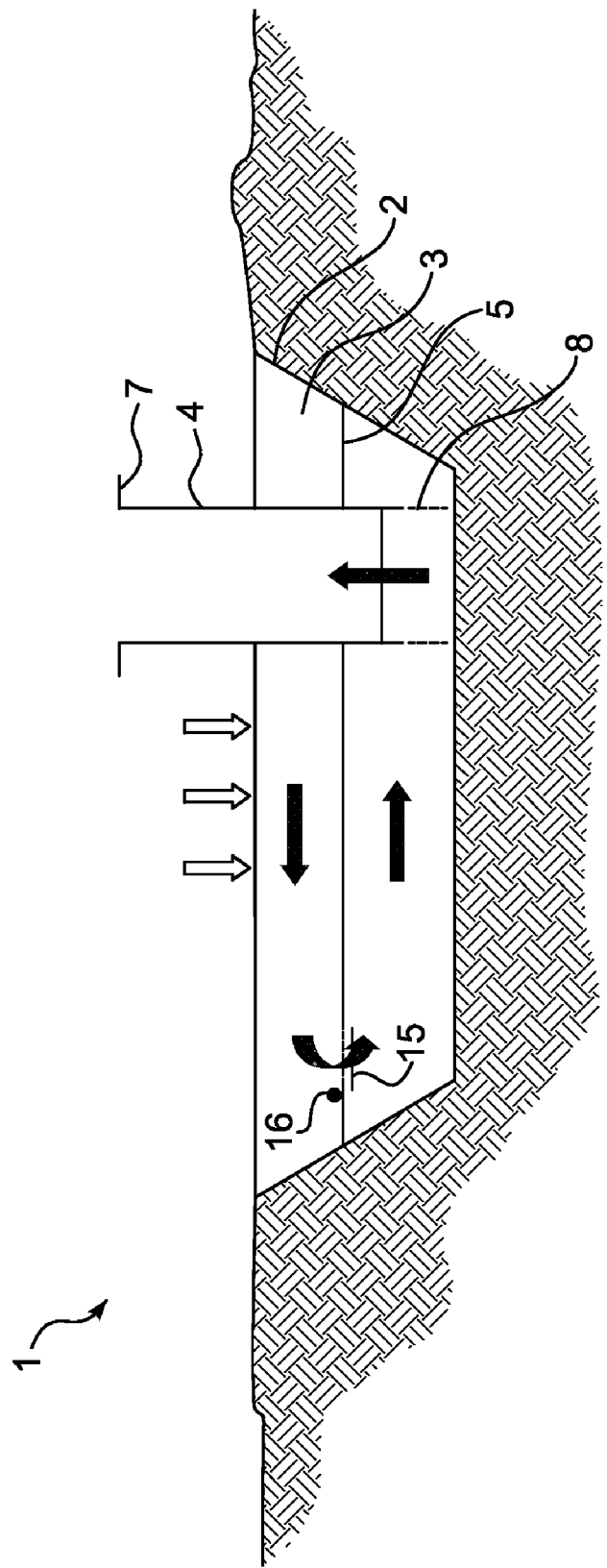

FIG. 1 illustrates a system 1 for water storage and water purification in accordance with one embodiment of the invention. As illustrated in FIG. 1, the system 1 comprises a substantially water-impermeable, artificial and outwardly delimited reservoir 2.

The use of an artificial, substantially water-impermeable reservoir 2 ensures that where possible no water is lost from the inventive system 1 into deeper, porous layers which attract water.

The simple seepage of water into deeper-lying layers is a problem which occurs in many places on Earth. An example of such a place is the high plateau of Johannesburg. This plateau is known for the fact that by reason of the porosity of the soil water disappears into deeper-lying underground streams and therefore is no longer available to the uppermost, humus-containing layer. Virtually no vegetation grows in this area during the winter months and sometimes for even longer.

Moreover, the substantially water-impermeable, artificial reservoir 2 ensures that where possible no water which is e.g. contaminated and/or contains salt can seep from the outside into the system 1 in accordance with the invention, and thereby reduces the quality of the water, which is to be stored and purified.

The reservoir 2 also has the advantage that the system 1 in accordance with the invention can be used independently of location, i.e. independently of the geological composition, climatic conditions and or the soil conditions at that location, for the purpose of water purification, water storage or irrigation.

As illustrated in FIG. 1, the reservoir 2 can be formed in the shape of a trough. However, it can also take any other suitable form. For example, it can be hemispherical in formation.

The reservoir 2 can be any suitable size. However, it has proven advantageous to adapt the size of the reservoir 2 to the amount of precipitation to be expected and to the amount of water to be stored. If the reservoir is disposed e.g. underneath a swimming pool, then it preferably comprises at least half the volume of the swimming pool.

The size of the reservoir 2 can also depend upon whether the system 1 in accordance with the invention is used for the purpose of water storage, water purification and/or irrigation. For example, a system 1 in accordance with the invention which is used mainly for irrigation purposes can be flatter in formation.

The reservoir 2 is filled at least partially with a porous material 3. Within the scope of the present invention, the phrase "at least partially" is to be understood to mean that the reservoir 2 is to be filled with at least as much porous material 3 as required to store and purify the water in a sufficiently effective manner.

Preferably, the porous material 3 is gravel, pebbles, sand (e.g. silica sand) or a mixture thereof. However, loam, silt and/or clay can also be used. Other materials, such as e.g. synthetic materials, can be used if they are able to store and transport water on account of their porosity, the ratio of the volume of all their cavities to their external volume.

With regard to the pore size of a porous material 3, it is necessary to differentiate between course, fine and micro pores. Course pores (macro pores) have a pore diameter of >1 mm (they are not visible to the naked eye). The fine pores are micro pores having a pore diameter of 0.1 to 0.1 μm. These capillary pores transport the water. The micro pores which are also referred to as ultra-micro pores or gel pores have a pore diameter of <0.1 μm and are instrumental in the slow, sustained transportation of water.

Preferably, porous material 3 is used with fine and/or micro pores. As a consequence, particularly slow transportation of water is achieved. In turn, this ensures that the water is kept for very long periods within the reservoir 2 and can thus be stored. Preferably, a circulation time of 10 to 30 days is to be provided in this case. A circulation time of at least 21 days has proven to be particularly advantageous.

The system 1 in accordance with the invention comprises a barrier layer 5 (FIG. 1) or several barrier layers 5 (FIG. 2, 3) which is/are disposed within the reservoir 2 above each other in respect to the ground surface. Each barrier layer 5 separates two layers of porous material 3 from each other. Moreover, each barrier layer 5 is provided with at least one passage 6 for water (FIG. 1, 2, 3). Water from precipitation will seep into and through the reservoir 2, from the topmost layer of porous material 3 to the lowest layer of porous material 3. At each barrier layer 5 the water will be collected, and will pass to the next lower layer of porous material 3 only by means of the passage 6 of the respective barrier layer 5.

With the exception of the passage 6, which is water-permeable, the barrier layer 5 is manufactured from a material which is substantially water-impermeable.

Within the scope of the present invention, the phrase "substantially water-impermeable" is understood to mean that the barrier layer 5 is formed in such a manner that the main part of the water which seeps through the reservoir 2 is prevented from passing through the barrier layer 5 into the region above or below the barrier layer 5.

The barrier layer 5 or barrier layers 5 serve to extend the seepage path of the water through the porous material 3 of the reservoir 2, since the water can only seep through the passages 6. By extending the seepage path, the water remains for a longer period below the surface. Therefore, it can be stored for a longer period within the reservoir 2. Moreover, the water is filtered over a longer period of time, thus improving the quality of the purified water.

The ability of the system 1 in accordance with the invention to store water and also the quality of the water purified by the system 1 in accordance with the invention increases with the number of barrier layers 5 used.

The improved quality of the purified water can be explained particularly by virtue of the fact that by reason of the barrier layer 5 or barrier layers 5 the rate, at which the water moves through the system 1 in accordance with the invention, is reduced or is repeatedly reduced anew. A flow rate which is as low as possible is particularly advantageous for the purpose of achieving a high degree of purification.

If the water reaches the barrier layer 5, it begins to accumulate as a result of subsequently seeping water, and as a consequence of the restricted opening of the passage 6. Normally, water passes through porous material 3 in an open-pored manner (through the interior of the material or via wall openings from one material to the next material) and in a closed-cell manner (always around the individual materials). However, in this accumulated condition the water penetrates into the capillaries of the porous material 3 particularly effectively and deeply. Therefore, it behaves rather in an open-pored manner. This ensures that in the region immediately in advance of the barrier layer 5 dirt and mud particles can sediment or settle particularly effectively in and on the pores of the porous material 3.

Figure 2:
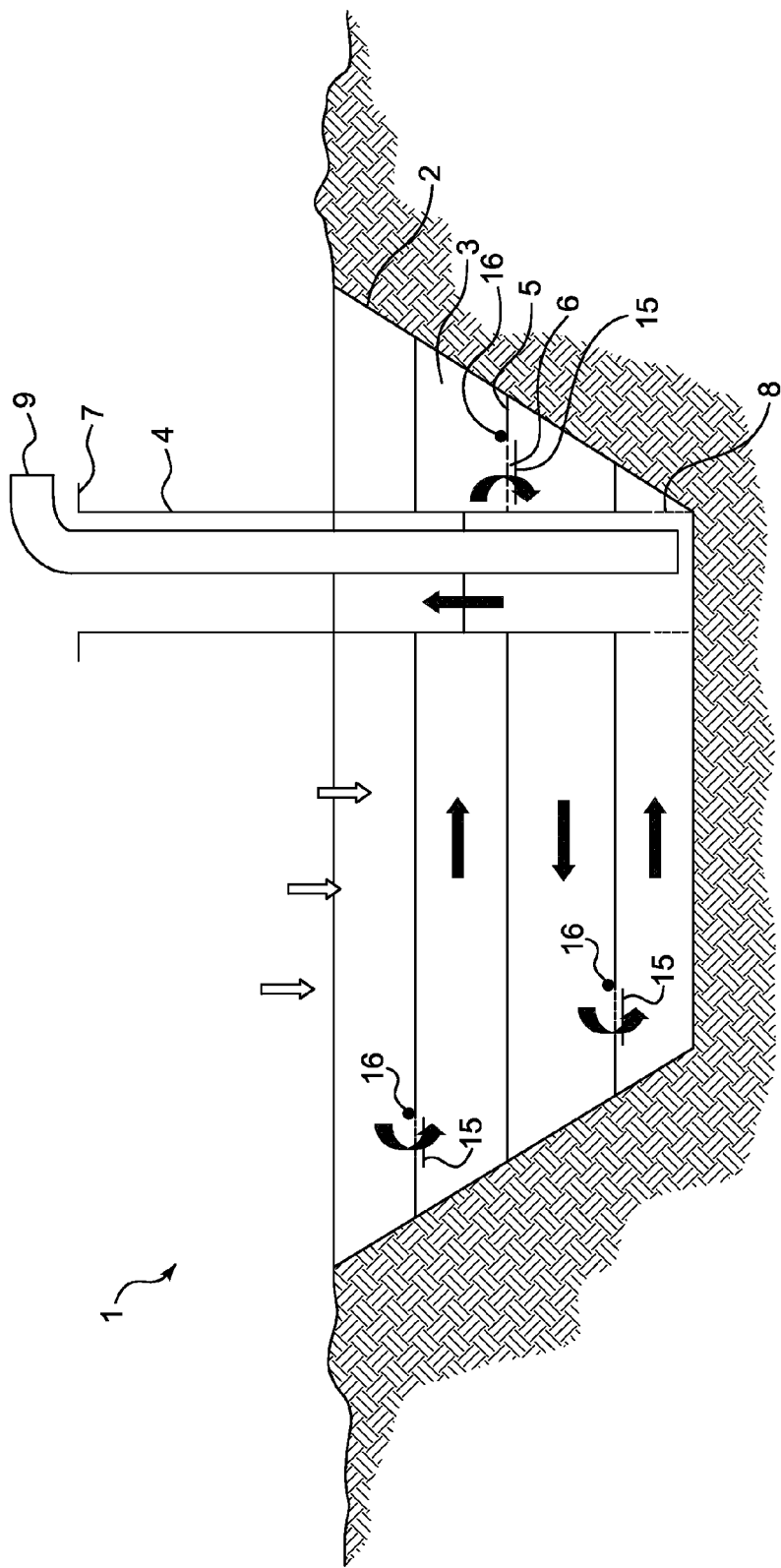

Preferably, the barrier layer 5 or barrier layers 5 is/are disposed in a horizontal manner, as illustrated in FIG. 1 and FIG. 2. When the barrier layer 5 is disposed in a horizontal manner, the seepage path of the water through the system 1 in accordance with the invention is at its longest, which has a particularly positive effect upon the quality of the purified water. However, any other inclined position of the barrier layer 5 is also possible if the characteristic of the barrier layer 5 to extend the seepage path of the water is not lost as a result. The individual barrier layers 5 within a system can each have the same degree of inclination but can also be different from each other in terms of their degree of inclination.

The passage 6 for water or the passages 6 for water take up on the whole only a small surface area relative to the entire surface of the barrier layer 5. Preferably, this amounts to a surface area of 5 to 20%. A surface area of 8 to 15% is particularly preferred. A surface area of 10 to 12% in relation to the entire surface of the barrier layer 5 is most preferred.

Preferably, the passage 6 for water is disposed at a selected location. For example, the passage 6 for water can be disposed in the outer region of the barrier layer 5, as illustrated in the exemplified embodiment in FIG. 1. The passage 6 for water is located preferably immediately in advance of the end of the barrier layer 5. A passage 6 for water which is located right at the end of the barrier layer 5 is most preferred. That is to say at a location on the sides of the system 1, where the barrier layer 5 is in direct contact with the reservoir 2. If water initially seeps in this region through the barrier layer 5, then the path covered by the water along the barrier layer 5 corresponds approximately to the maximum possible. In this case, the purification result is particularly good.

Owing to the fact that it is possible to be able to vary the flow rate of the water through the system 1 in accordance with the invention in any manner by the number, size and/or geometry of the passage 6, a suitable separation rate can be found for any separation problem and very good purification results can be achieved with the system 1 in accordance with the invention irrespective of the degree of contamination of the water.

To this end it can be beneficial to construct the opening, i.e., the geometry, of the passages 6 controllable. For example, a shutter 15 could be controlled to close or open the passage 6 completely or partially, depending on the requirements. Such a control could be preformed electrically and/or mechanically. However, to avoid electric installations, shutters 15 could be constructed, which automatically regulate the flow rate of water through the passage 6, for example, depending on the total amount of water seeping into the system 1 or accumulating at the barrier layer 5, or depending on external conditions, like temperature or dampness of the soil. In a system 1 with several barrier layers 5 and passages 6, the geometries can of course be all the same, or can vary, depending, for example, on the porous material 3, which is arranged above and below the barrier layer 5. Also, differently controlled shutters 15 or valves can be installed to set different flow rates in different regions of porous material 3.

It has proven to be particularly advantageous if the passage 6 for water within the barrier layer 5 is provided in the form of a slot or a hole.

Figure 3:
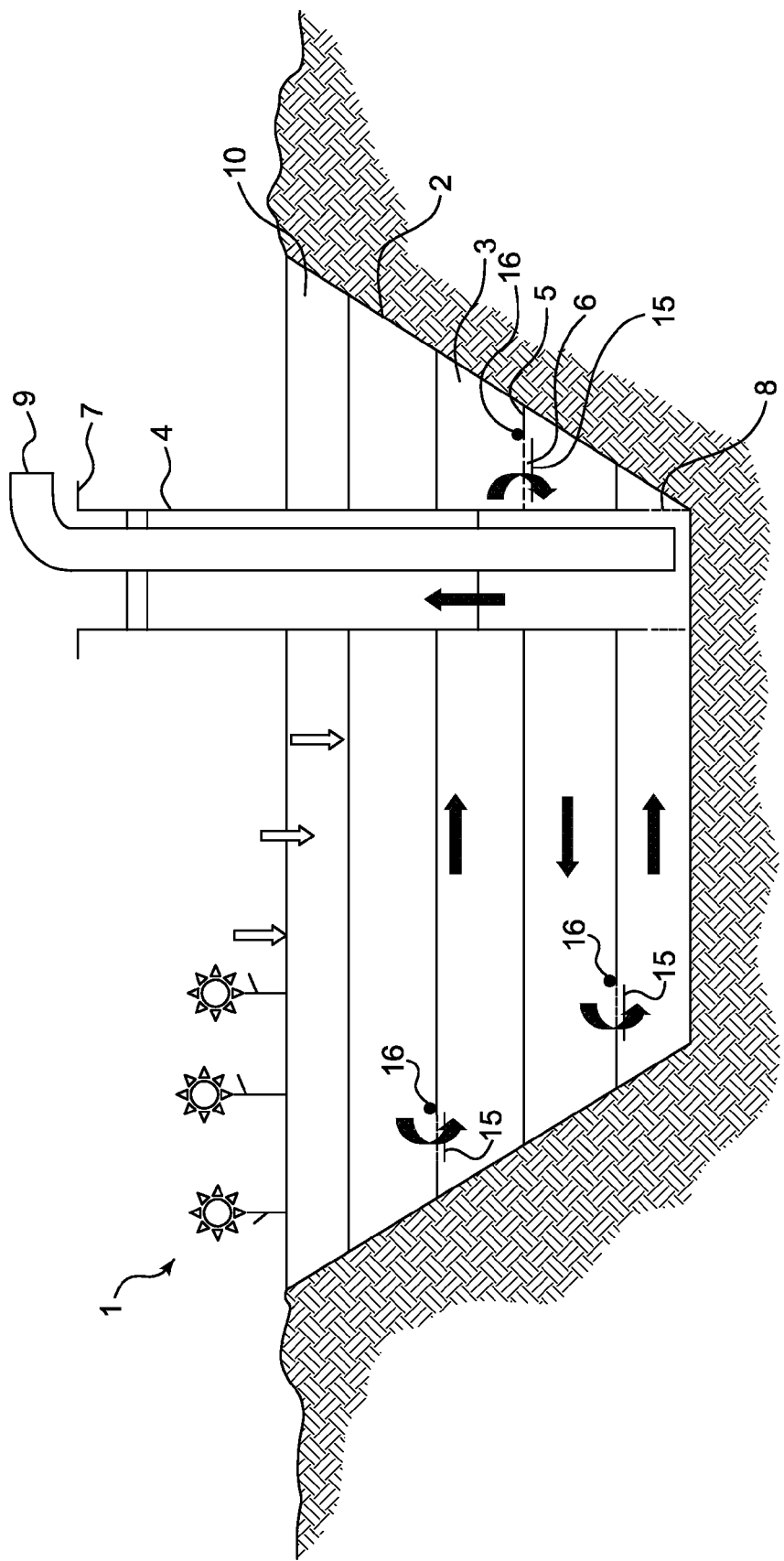

In the case of at least two barrier layers 5, it is preferable to dispose the passages 6 of in each case two adjacent barrier layers 5 in an offset manner with respect to each other (see FIG. 2 and FIG. 3). Passages 6 for water which are disposed opposite to each other are most preferred.

By virtue of the offset arrangement of the passages 6 for water, the seepage path of the water through the system 1 in accordance with the invention is extended or formed to the maximum extent possible. In turn, this means that the retention period of the water within the system 1 in accordance with the invention increases. For example, the retention period of the water within a system 1 in accordance with the invention with two barrier layers 5 and in each case a passage 6 for water disposed opposite at the end of the barrier layer 5 increases, in the case of a given volume and with a selected porous material 3, approximately threefold and in the case of a system 1 in accordance with the invention having three barrier layers 5 the retention period increases approximately fourfold with respect to the retention period of the water in a system which does not comprise any barriers. However, the increase in the retention period of the water to be purified has a particularly positive effect upon the quality of the purified water. Moreover, more water per unit of time and volume element can be stored within the system 1 in accordance with the invention.

The porous material 3 which is located above and below the barrier layer 5 can be one and the same material. However, it has proven to be particularly advantageous if the porous material 3 is different above and below the barrier layer 5. The reason for this is as follows: by varying the porosity of the porous material 3 within the system 1 in accordance with the invention, the water is subjected repeatedly to new resistances or attraction forces which cause the water in the interior of the system 1 in accordance with the invention to move forth at different flow rates. This enhances the quality of the filtered water once again.

The system 1 in accordance with the invention provides a level of water quality corresponding to drinking water quality. If water is held underground by the system 1 in accordance with the invention for a period of at least 19 days, it is actually germ-free or sterile. Through the use of porous material 3, e.g. silica sand which by reason of the storage is subjected repeatedly to different pressures and reacts thereto with an electric polarisation (piezoelectric effect), microorganisms are actually killed off or inactivated. This procedure can be accelerated still further through the use of various porous materials 3.

The quality of the water depends on the amount of porous material 3 it interacts with and accordingly the length of the waters seeping path. Therefore, deeper reservoirs 2 provide better water quality than shallower reservoirs 2. Therefore, the depth of the reservoir can vary with the purpose, for which the water is stored. Typically drinking water requires a larger degree of purification than water for irrigation. The quality of water also changes within a reservoir 2, from the top to the bottom, especially water which is accumulated at different barrier layers 5. Another aspect, for which the depth of the reservoir 2 can be varied, is at which depth the stored water is needed. For example for irrigation purposes, different types of vegetation have their roots in different depths of the soil.

For example, the main vegetation used for golf courses is grass, on roughs and greens. Grass has shallow roots, and thus the system 1 of the present invention needs to provide stored water for irrigation purposes typically in a range of 30 to 50 cm below the soil. Preferably sand as the porous material 3 is used.

Preferably, the reservoir 2 and/or the barrier layer 5 comprise a geotextile. In turn, the geotextile comprises in its simplest embodiment a layer of woven material or non-woven material which is permeated by polyurethane.

The use of a geotextile has the advantage that where possible undesired water, such as e.g. salt water in coastal regions, is not able to penetrate or seep into the system 1 in accordance with the invention. Moreover, water which for storage purposes is introduced into the system 1 in accordance with the invention (artificially or naturally through rainfall) is kept within this system 1. It is not able simply to seep into deeper layers. A further advantage of the geotextile is that it also takes part in thermally or mechanically induced displacements in the structure of the soil (e.g. in the case of an earthquake). By virtue of its stability and weathering resistance it is resistant to damage caused by roots or sharp stones even after a relatively long period of use.

It is also advantageous that the external shape of the geotextile can be adapted to the terrain at that location. This can be attributed to the specific method by which it is produced. Consequently, a reservoir which comprises a geotextile can be used in an extremely flexible manner. This saves time and additional costs, e.g. for earth work.

The polyurethane which is used for the geotextile can be formed by polymerisation of a two-component system consisting of a polyol component, comprising a polyether polyol, a polyester polyol, a propylene oxide homopolymer and pulverised molecular sieve and of an isocyanate component comprising diphenylmethane-4,4'-diisocyanate.

The mass ratio of polyol component to isocyanate component is preferably in a range of about 108:15 to about 102:21, more preferably in a range of about 106:17 to about 104:19 and most preferably it is about 105:18.

If the geotextile comprises a non-woven material, then it has proven to be particularly advantageous if in addition the non-woven material comprises staple fibres of 3 to 15 cm in length. Preferably, the staple fibres consist of a synthetic material which is selected from polypropylene, polyethylene, polyacrylonitrile, polyamide, polyvinylchloride and polyester.

The non-woven material can also comprise wires. Laminar structures (leaflets) consisting of elastomeric polymers, primarily consisting of natural raw materials can optionally also be included.

The staple fibres or where desired wires and/or leaflets can be joined together such that their strength is directionally independent. As a consequence, a surface formation is achieved which is flexible with respect to the ground and adapts effectively to an uneven subsurface without the risk of damage being caused to the structure.

If the geotextile comprises a woven material, then this woven material consisting of crossing threads and fibre systems (woven fabric) is used exclusively as reinforcement and to receive the polyurethane.

The geotextile can be produced in the following manner: initially, a given ground area is excavated. The excavated quantity of earth corresponds to the calculation according to the precipitation to be expected and to the desired water quantity which is to be stored. Then, the layer, which is used as reinforcement, is laid out on the ground to be sealed (e.g. a pit) so as to cover the surface. Subsequently, the polyol component and the isocyanate component are sprayed onto the prepared layer by means of a spraying machine. Both components ultimately cure within a short period of time (several minutes) of their own accord thus forming the polyurethane.

When the two components are sprayed on, the cavities and/or intermediate spaces which are present between the above-described fibres, wires and/or leaflets are filled in the layer consisting of non-woven material or woven material, so that after curing these cavities and/or intermediate spaces are substantially sealed. At the same time, the fibres, wires and/or laminar structures are fixedly connected to each other in a mechanical manner by the polyurethane, wherein by reason of the specific meshwork the enormous flexibility of the polyurethane is retained in full.

In this context, the phrase "substantially sealed" is understood to mean that the passage output for water through the layer (in liters of water per $m^2$ of layer surface and time) is reduced by the polyurethane, which has penetrated, preferably by at least 99%, more preferably by at least 99.9% when compared with an identical but polyurethane-free layer. It is particularly preferred to provide a sealing effect by means of the polyurethane such that the finished geotextile is water-impermeable and therefore water-tight.

After application of a first layer of polyurethane, the spraying procedure can be repeated by the application of a second layer. This increases the stability of the layer once again.

Where desired, a second layer of woven material or non-woven material can also be applied to the formed geotextile. This second layer can be used as additional protection against the penetration of roots.

Even in the case of a geotextile which preferably comprises a second layer of a woven material or non-woven material, the cavities and/or intermediate spaces present in the second layer are filled by the polyurethane. Moreover, the first and second layers are adhered together by means of polyurethane.

It has proven to be particularly advantageous if the outer surfaces of the first and/or second layer are also coated with the polyurethane.

Polyurethane has the advantage that it has a high tear strength and fracture coverage (well in excess of 200%). It is resistant to all environmental influences and also to salt-containing or contaminated soils. It is also not subjected to any ageing and embrittlement processes. Even when constantly exposed to weather, it is resistant for a period of 20 years. The use of the polyurethane together with a non-woven material or woven material serves to delay ageing of the polyurethane still further (by about one order of magnitude).

Moreover, as illustrated in the exemplified embodiment in FIGS. 1, 2 and 3, the system 1 in accordance with the invention comprises a water collecting container 4. The water collecting container 4 extends from the bottom of the reservoir 2 at least to the surface thereof. Furthermore, the water collecting container 4 comprises an opening 7 above the uppermost barrier layer 5 and at least one opening 8 below the lowermost barrier layer 5, through which water can flow.

As shown in FIGS. 1, 2 and 3, the water collecting container 4 can also be a fountain. However, any other suitable water collecting container 4 can also be used. For example, the water collecting container 4 can also be a turnpike.

Preferably, the water collecting container 4 is connected via the opening 7 to the water-removal station 9. The water-removal station 9 can be used to remove water which by reason of its hydrodynamic potential has travelled into the porous layer below the lowermost barrier layer 5 and then has seeped further through the opening 8 or openings 8 into the water collecting container 4. The water-removal station 9 is illustrated in the exemplified embodiment in FIGS. 2 and 3.

It has proven to be advantageous if the water-removal station 9 is formed in such a manner that it completely closes the opening 7 in the water collecting container 4 (see FIG. 3). In this manner, no water (e.g. rainwater) is able to flow via the opening 7 into the water collecting container 4. As a consequence, the water level within the water collecting container 4 is not changed unintentionally. Moreover, the water within the water collecting container 4 is not contaminated by unfiltered water.

Preferably, the opening 8 is a hole or a slot. If the water collecting container 4 comprises more than one opening 8, then these openings 8 can be present in the form of holes and/or slots. However, they can also take any other suitable form. In the exemplified embodiment in FIGS. 1-3, the water collecting container 4 comprises openings 8 in the form of slots. By selecting the number, size and geometry of the openings 8, it is possible to vary the rate at which the water seeps into the water collecting container 4. When selecting the size and geometry of the openings 8, it is necessary to ensure that where possible no porous material 3 passes into the water collecting container 4.

In a preferred manner, the water-removal station 9 is a pump station.

By pumping out water from the water collecting container 4, the flow rate of the water through the system 1 in accordance with the invention can be varied (change in the hydrodynamic potential).

For example, water moves through the reservoir 2 all the more quickly the higher the water level within the reservoir 2 in comparison with the water level within the water collecting container 4 after pumping out and the lower the resistance afforded by the porous material 3 to the water seeping through.

By reason of the pumping out procedure, it is thus also possible to vary the retention period of the seeping-through water within the system 1 in accordance with the invention, which in turn has an effect upon the quality of the water to be purified.

Preferably, the filtered water is pumped out such that the retention period of the water within the reservoir 2 is as long as possible because the longer the water seeps through the interior of the reservoir 2 the purer it is. It also has a particularly advantageous effect upon the purification result if during filtering the seeping-through water is subjected repeatedly to new pressure ratios. Initially, the water seeps through the system 1 until it has arrived below the lowermost barrier layer 5 at the bottom of the reservoir 2. By reason of the subsequently flowing water, the level in the system 1 rises and the water is then urged from below in an upwards direction both through the water collecting container 4 as a riser pipe and through the passages 6 of the barrier layers 5. This results in the water being recirculated in the system 1. With the water which continues to flow from above, this recirculation results in still further improved purification of the water in the system 1.

Figure 5:
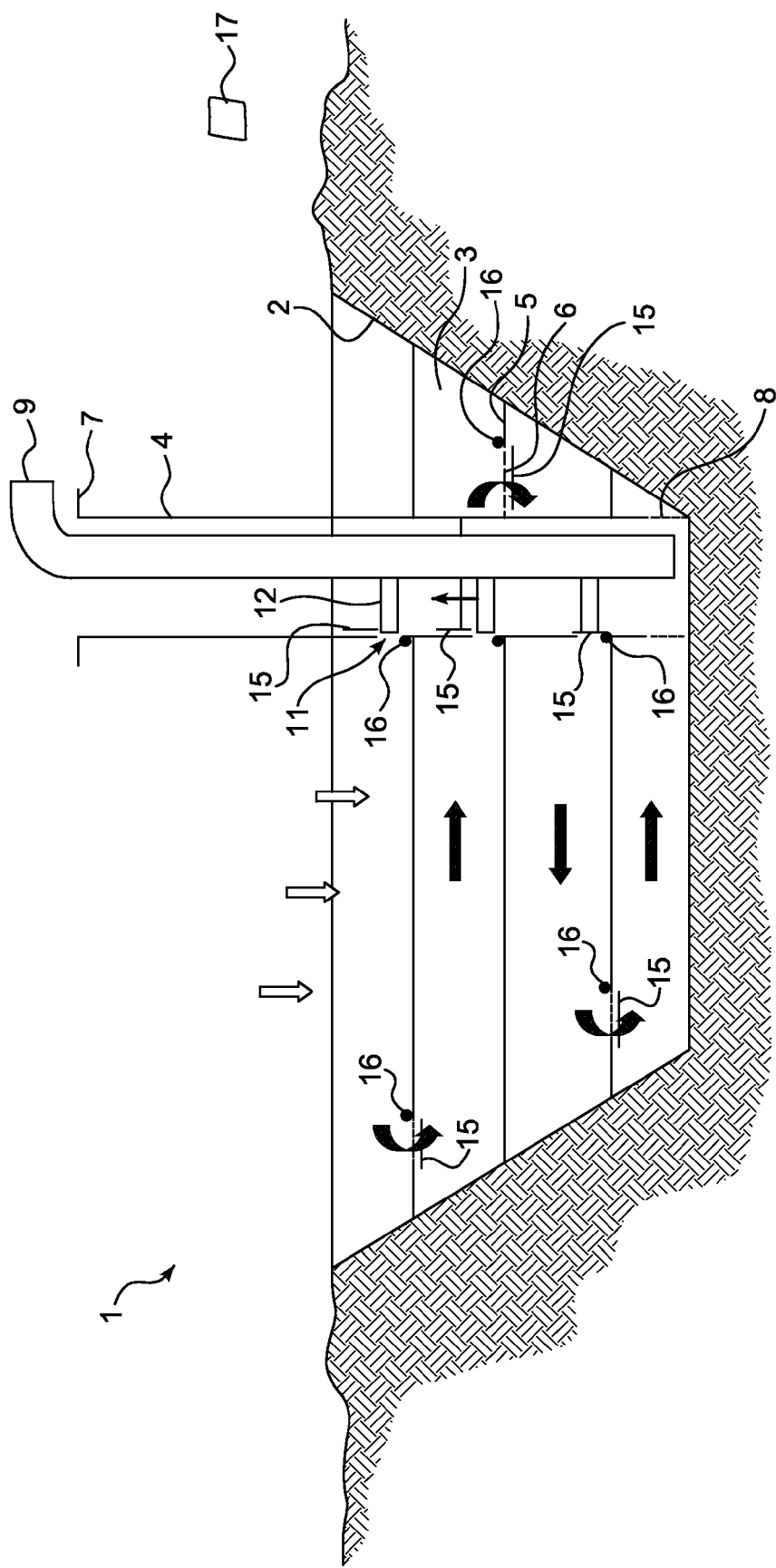
FIG. 5 shows an inventive water-storage and water purification system having three barrier layers.

FIG. 5 shows another embodiment, in which the system 1 comprises, namely the container 4, comprises further openings 11, wherein each of the further openings 11 is located directly above one barrier layer 5. Further, conduits 12 are shown in FIG. 5, which provide a passage for water seeping through one of the openings 11 to the water removal-station 9 so that the water can be removed, e.g. pumped out.

Water accumulated at each of multiple barrier layers 5 in the system 1 can be obtained by means of the additional openings 11. Preferably, each opening 11 and the opening 8 can be controlled to be open or closed, so only water accumulated at a specific one of the multiple barrier layers 5 can be selectively removed from the system 1.

For different purposes a different water quality might be required. For example, water for irrigation naturally needs to be of lower quality than drinking water. Also different vegetation needs water with for example different amounts of fertilizer or nutrients. Since due to the fact, that with each further layer of porous material 3, through which the water seeps, the water quality is further improved, the possibility to remove water in different purification stages is possible.

Preferably each opening 11 is provided with a shutter 15, which can be controlled to be open or closed, or to be partially open. Such a shutter 15 could be controlled electrically or mechanically. Depending on which water quality is required, the appropriate shutter 15 can be opened to remove water from the system 1. The other shutters 15 are preferably closed when water is removed. Also the passages 6 for water beneath the opening 11, through which water is removed from the system 1 should be closed, so that no further seepage of water into deeper layers occurs.

At each of the further openings 11, i.e., directly before each barrier layer 5, a sensor 16 is preferably placed, which measures the quality of the water at that barrier layer 5. The sensor 16 preferably is a biochemical sensor adapted to measure the concentration of particles in the water. Especially the concentration of pesticides, fungicides, nutrients or fertilizer can be measured by each of the multiple sensors 16. The sensors 16 can either be operated to perform continuous measurements, measurements in intervals, or measurements on specific demand by, e.g., a user.

By means of the sensors 16, the water quality at each of the openings 11 is always monitored, and water with the appropriate quality can be removed. The system 1 can further comprise a control unit 17, which determines through which of the openings 11 water is to be removed for a specific purpose. Thereby, the control unit 17 takes into account the measurements of one or multiple sensors 16. If, for example, water having a specific concentration of fertilizer or pesticides is needed (not more and not less), the control unit 17 can determine at which barrier layer 5 the water fulfils these requirements, and can control the respective shutter 15 at the respective opening 11 to be opened and the other shutters 15 to be closed. If then, with time, the concentration of the water accumulated at the barrier layer 5 where the shutter 15 is open changes, for example, due to new water seeping in from above and/or due to possible external influences which change the purification ability of the system 1, the control unit 17 can determine to close the open opening 11 and to open another closed opening 11 at another barrier layer 5, e.g., the one above or below, if the respective sensor 16 indicates that water with the specific concentration is present.

As illustrated in the exemplified embodiment in FIG. 3, a cultivation layer 10 can be applied to the layer of porous material 3 above the uppermost barrier layer 5 of the system 1 in accordance with the invention. The cultivation layer is preferably a humus-containing layer, but can also be a certain landscape, like a park or a golf course.

It has proven to be particularly advantageous if the porous material 3 above the uppermost barrier layer 5 has a high degree of capillarity or a high water absorption coefficient.

The capillarity is a physical characteristic which is established by adhesion, cohesion and surface tension and which serves to transport liquids and the substances contained therein within micro capillaries, gaps and pores in all directions, i.e. also in opposition to gravitational force.

If the porous material 3 in the upper layer has micro capillaries, then it takes in water until it is saturated and is not able to absorb any more water. This water can then serve the humus-containing layer as a direct water reservoir. As a consequence, it is also possible for vegetation to grow in regions with low precipitation.

This high-capillary layer of porous material 3 which consists preferably of micro pores also has the effect of an insulating layer for the entire system 1 in accordance with the invention. It can hold water in a particularly effective manner and can also prevent it from evaporating on the soil surface.

Figure 6:
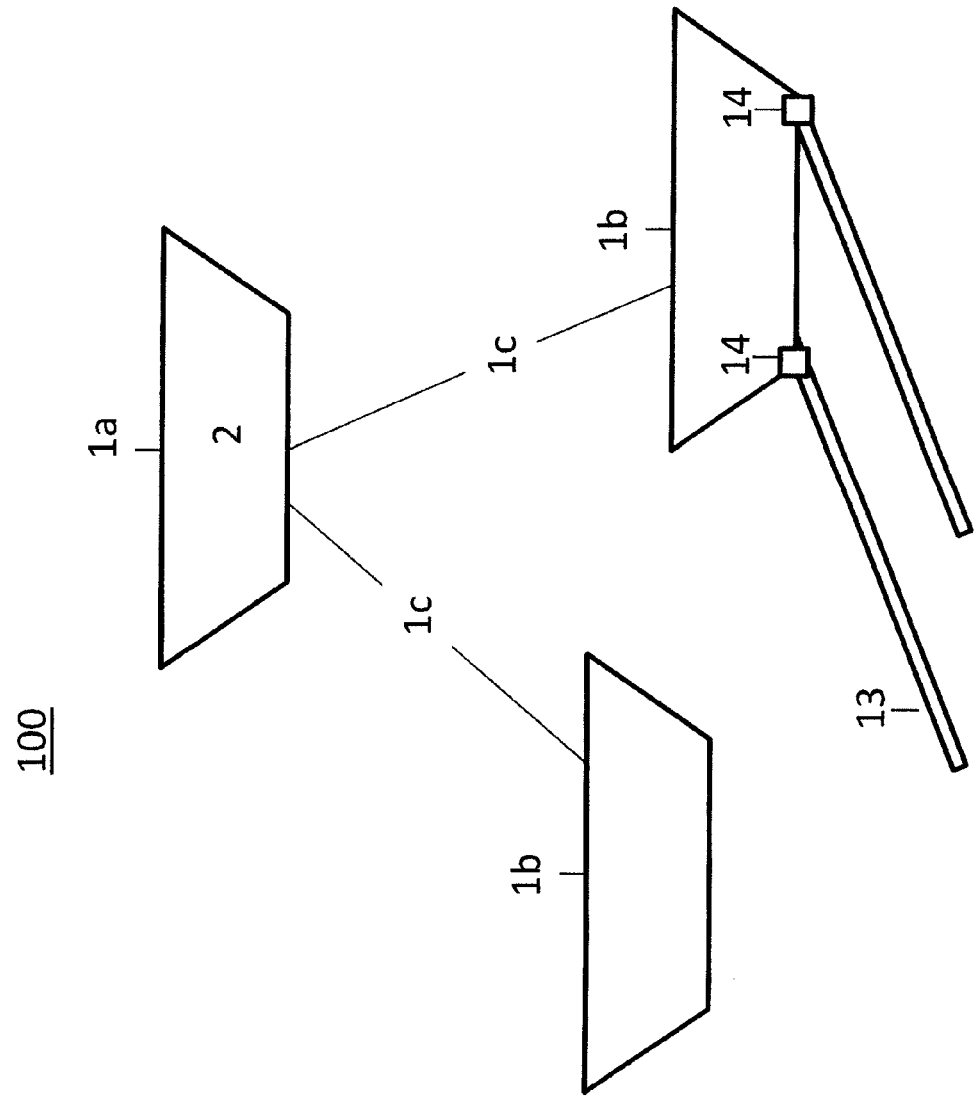
FIG. 6 shows an irrigation network with multiple inventive water-storage and water-purification systems.

In another embodiment of the invention, shown in FIG. 6, an irrigation network 100 formed by connected water-storage systems 1 according to the present invention is envisaged. One of the connected water storage system 1 can act as a main system 1*a*, while the other water storage systems 1 can be secondary systems 1*b*. The main system 1*a* is preferably provided higher above sea-level than the secondary systems 1*b*, most preferably 30 to 40 m higher. The main system 1*a* and the one or more secondary systems are connected via a distribution system, preferably conduits 1*c*, and the gravitational energy of the main system 1*a* in respect to the secondary systems 1*b* provides a water pressure, so that water can flow from the main system 1*a* to secondary systems 1*b*. The one or more secondary systems 1*b* are preferably located at lower positions in the landscape, i.e. troughs, ditches or the like, in order to collect water from the surrounding terrain.

With the distribution of many connected systems 1, an exhaustive water supply, e.g. for irrigation of fields, parks or golf courses can be achieved. When the area, which needs to be irrigated expands, further secondary systems according to systems 1 of the present invention can be added to the distribution network. Water can be pumped between the connected systems 1, or can be removed as described above from each of the systems 1.

An irrigation network 100, as shown in FIG. 6, with one or more of the water storage systems 1 according to the present invention, has at least one reservoir 2 and has trenches 13, which are connected to the at least one reservoir 2. The trenches 13 are preferably also filled with a porous material 3. The trenches 13 preferably extend along or through an area, below the soil, which is to be irrigated. Instead of trenches 13, larger water pockets beneath an area to be irrigated can fulfil the same function. The size of the reservoir 2 is preferably chosen based on the amount of precipitation in the area, where the irrigation network is installed. The ratio of the volume of the reservoir 2 to the volume of the trenches 13 depends on said amount of precipitation, as well.

Preferably, one or more regulators 14 are provided, in order to control the water level in the trenches 13. The water level in the trenches 13 can for example be lowered, by pumping water to the reservoir 2, or can be increased by pumping water from the reservoir to the trenches 13. The water level in the irrigation trenches 13 can also be the same as the water level in the reservoir 2, so no pumps are necessary. Preferably, in this case the reservoir 2 belongs to a secondary water storage system 1*b* as described above, and the water level can be controlled by pumping water into a main water storage system 1*a*, or by letting water flow from the main system 1*a* to the secondary system 1*b*, and can thus be regulated in respect to the main water storage system 1*a*. Thus, depending on the amount of required water for irrigation (seasonally differences), the water level in the trenches 13 can be regulated.

By connecting the trenches 13 to a reservoir 2 as described above, from which water at different barrier layers 5 in the reservoir 2 can be obtained by means of the different openings 8, 11, shutters, and conduits 12, not only the water level in the trenches 14 can be regulated, but also the water quality, i.e. the concentration of pesticides, nutrients, fungicides, or fertilizer of the water in the irrigation trenches can be controlled.

An irrigation network 100 described above, can be easily installed, and blends invisibly into the landscape. Further, the maintenance costs of such an irrigation system are low. The present invention thus provides a very cost effective solution. This is especially useful for the design of golf courses, for which such new cost effective solutions are desired. So far, especially the costs for watering, irrigation and fertilizing are very high, but necessary, in order to provide an excellent shape of the course.

Green-grass for example has shallow roots and is very sensitive, i.e. it needs to be watered correctly, and the right amount of fertilizer etc. is necessary. In particular, if the green-grass is also needed during winter seasons, a regular irrigation of the grass is required during summer season. By means of the above, a golf course can be equipped with an efficient irrigation network 100. The regulators 14 described above can be used to regulate the height, to which water will rise up in e.g. the irrigation trenches 13 to support the optimum growth of the grass. By filling the trenches 13 with the appropriate water quality, e.g. the correct amount of fertilization can be applied for an optimum growth of the grass.

For green-grass instead of the described trenches 13, water pockets can be provided closely below the grass-growing soil. Preferably the porous material 3 in these pockets is sand. In case of heavy precipitation these sand filled pockets can also serve as drainage, in order to prevent water from accumulating on the green.

The invention relates to a further water-storage and water-purification system 1'.

Figure 4:
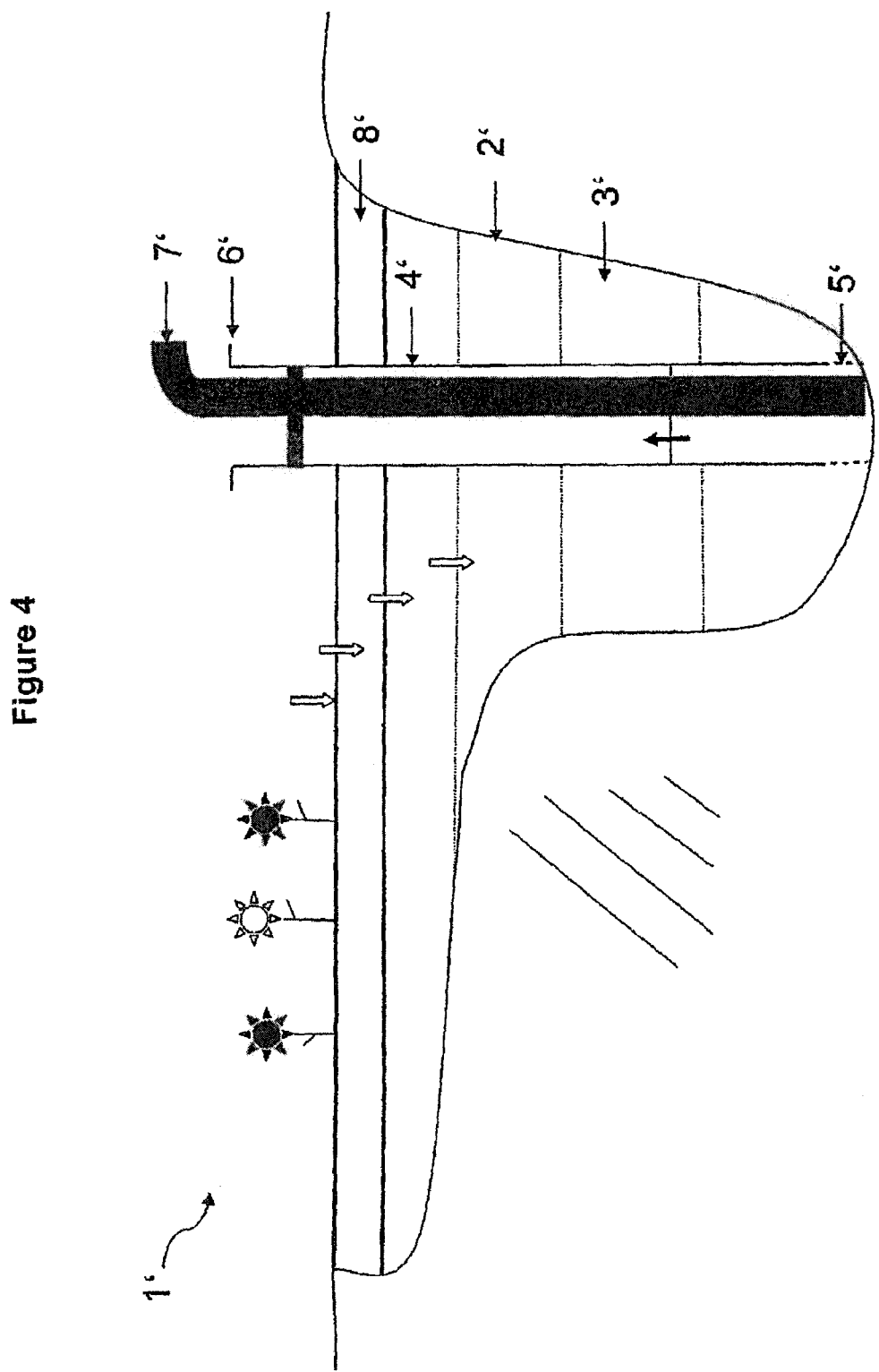

FIG. 4 illustrates a system 1' for water storage and water purification in accordance with a further embodiment of the invention. As illustrated in FIG. 4, the system 1' comprises a substantially water-impermeable, artificial and outwardly delimited reservoir 2'.

As illustrated in FIG. 4, the reservoir 2' can be formed in a specific trough shape. However, it can also take any other suitable form. For example, it can be hemispherical in formation.

In relation to the further characteristics of the reservoir 2', reference is made to the foregoing. It applies to this further embodiment of the invention accordingly.

Preferably, the reservoir 2' comprises a geotextile. In turn, the geotextile comprises in its simplest embodiment a layer of woven material or non-woven material which is permeated by polyurethane.

The polyurethane which is used for the geotextile can be formed by polymerisation of a two-component system consisting of a polyol component, comprising a polyether polyol, a polyester polyol, a propylene oxide homopolymer and pulverised molecular sieve and of an isocyanate component comprising diphenylmethane-4,4'-diisocyanate.

In relation to the further components (fibres, wires, leaflets) of the non-woven material and of the woven material, reference is made to the description of the geotextile in the first embodiment of the method in accordance with the invention. The same applies to the geotextile production method.

The reservoir 2' is filled at least partially with a porous material 3'. Within the scope of the present invention, the phrase "at least partially" is to be understood to mean that the reservoir 2' is to be filled with at least as much porous material 3' as required to store and purify the water in a sufficiently effective manner.

Preferably, the porous material 3' is gravel, pebbles, sand (e.g. silica sand) or a mixture thereof. However, loam, silt and/or clay can also be used. Other materials, such as e.g. synthetic materials, can be used if they are able to store and transport water on account of their porosity, the ratio of the volume of all their cavities to their external volume.

By selecting the porous material 3', it is possible to vary the flow behaviour of the water within the system 1' in accordance with the invention.

Water always seeks the path of lowest resistance. This is also the case with the flow behaviour of water within the system 1' in accordance with the invention (this also applies to the system 1). Porous material 3' which is not saturated by water absorbs water whereas porous material 3' which is saturated by water releases water into less saturated regions. The flow current then results from this. The use of porous material 3' whose capillarity increases in the direction of the bottom of the reservoir 2' ensures e.g. that the water is drawn (in addition to gravitational force) into deeper-lying layers. However, if porous material 3' is selected whose capillarity increases in the direction of the surface of the reservoir 2', water is drawn (in opposition to gravitational force) into higher layers.

It has thus proven to be advantageous if various layers of porous material 3' having a different degree of capillarity are disposed within the reservoir 2'.

It is particularly advantageous if the porous material 3' in the lower layer is more porous than the porous material 3' in the upper layer. In this case, it is possible to achieve a particularly high level of water quality (drinking water quality) of the filtered water.

The system 1' in accordance with the invention also comprises a water collecting container 4' which extends from the bottom of the reservoir 2' at least to the surface thereof, wherein the water collecting container 4' comprises an opening 6' in the upper region and at least one opening 5' in the lower region, through which openings water can flow.

Preferably, the water collecting container 4' is a fountain or a turnpike. In the exemplified embodiment in FIG. 4, the water collecting container 4' is a fountain.

The water collecting container 4' can be connected via the upper opening 6' to a water-removal station 7' (see FIG. 4). Water which by reason of its hydrodynamic potential has seeped as far as the bottom of the reservoir 2' and has then passed further via the opening 5' or openings 5' into the water tank 4' is removed via the water-removal station 7'.

The water-removal station 7' can be e.g. a pump station. By removing water from the water collecting container 4' with the aid of the pump, the inherent hydrodynamic potential of the water flow can be increased by the system 1' in accordance with the invention.

It has proven to be particularly advantageous to select the hydrodynamic potential in such a manner that the retention period of the water within the reservoir 2' is as long as possible. The reason for this is that the more slowly the water seeps through the reservoir 2' the purer it is when it reaches the water collecting container 4'.

Preferably, the opening 5' is a hole or a slot. If the water collecting container 4' comprises more than one opening 5', then these openings 5' can be present in the form of holes and/or slots. However, the openings 5' can also take any other suitable form. The water collecting container 4' in the exemplified embodiment in FIG. 4 comprises openings 5' in the form of slots. By selecting the number, size and geometry of the openings 5', it is possible to vary the rate at which the water seeps into the water collecting container 4. When selecting the size and geometry of the openings 5', it is necessary to ensure that where possible no porous material 3' passes into the water collecting container 4'.

It has proven to be advantageous if the water-removal station 7' is formed in such a manner that it completely closes the opening 6' in the water collecting container 4' (see FIG. 4). In this manner, no water (e.g. rainwater) is able to flow via the opening 6' into the water collecting container 4'. As a consequence, the water level within the water collecting container 4' is not changed unintentionally. Moreover, the water within the water collecting container 4' is not contaminated by unfiltered water.

As illustrated in the exemplified embodiment in FIG. 4, a cultivation layer 8' can be applied to the uppermost layer of porous material 3' of the system 1' in accordance with the invention. The cultivation layer is preferably a humus-containing layer.

It has proven to be particularly advantageous if the porous material 3' in the uppermost layer has a high degree of capillarity or a high water absorption coefficient. The water located in the capillaries is then available to the humus-containing layer as a direct water reservoir. As a consequence, intensive horticulture can also be conducted in very dry regions on Earth.

The systems 1 and 1' in accordance with the invention are particularly suitable for agricultural and forestry applications, e.g. for re-cultivation of soils or for reforestation. Moreover, the systems 1 and 1' in accordance with the invention are suitable for water storage (e.g. of rainwater) and water purification. The water to be filtered can be rainwater. The desalination of seawater (for the provision of drinking water) can likewise be conducted with the systems 1 and 1' in accordance with the invention.

The systems in accordance with the invention can be used independently of location. For example, they can also be used in coastal regions close to the sea or in regions with a high salt content in the soil. The known systems for water purification and water storage do not offer any solution to this.

The systems 1 and 1' in accordance with the invention can ensure the supply of water in dry regions. Often, it is even possible to achieve a further harvest.

Moreover, water can be purified to a particularly high level of quality using the systems 1 and 1' in accordance with the invention. The use of a substantially water-impermeable reservoir 2, 2' ensures that water which has already been filtered or water which is yet to be filtered is not contaminated where possible by water, which is loaded with e.g. pollutants, seeping into the system 1, 1'.

Furthermore, the use of porous material 3 in combination with at least one barrier layer 5 extends the seepage path of the water thus making it possible to keep water for a very long period within the reservoir (particularly effective water storage). Through the additional use of various porous materials 3, it is possible to enhance the ability of the system 1 to store water still further. Furthermore, the quality of the purified water is further improved.

The invention will now be illustrated by the following Example. They are [sic] provided for illustration purposes only but do not limit the scope of protection.

EXAMPLE

In order to produce the reservoir, a layer of non-woven material was laid out in a pit which had been dug into the ground near the coast to a depth of 3.5 m, a width of 5 m and a length of 10 m. Applied to this layer was a first layer of polyurethane which had the following formulation:

|  | Parts by weight |
|---|---|
| Polyol component: | |
| polyether polyol | 25 |
| (obtainable by polymerisation | |
| of ethylene oxide with ethylene glycol, MG 440) | |
| polyester diol | 26 |
| (obtainable by polymerisation of | |
| ethylene glycol and adipic acid, MG 390) | |
| polyester diol | 6 |
| (obtainable by polymerisation of | |
| ethylene glycol and adipic acid, MG 340) | |
| homopolymer of propylene oxide | 7 |
| polyether polyol | 15 |
| (Voralux HN 370, hydroxyl number 26-30 mg KOH/g) | |
| polyether polyol | 13 |
| (obtainable by polymerisation of | |
| propylene glycol with ethylene glycol, MG 4000) | |
| 1,4-butanediol | 7 |
| 5 A pulverised molecular sieve | 4 |
| Total: | 103 |
| Isocyanate component: | |
| diphenylmethane-4-4'-diisocyanate | 21 |
| Total: | 21 |

The formulation was sprayed on by means of a high-pressure cleaner. The spraying pressure was about 200 bar for the polyol and isocyanate components. Both components were sprayed on separately. The spraying temperature was 25° C. for the isocyanate component and 35° C. for the polyol component. The relative spray output of the two nozzles corresponded to the mass ratio of the polyol component to the isocyanate component. So much of the formulation was applied that continuous impregnation of the layer was achieved. After application of the components, polyurethane was formed by polymerisation. This procedure was repeated with the formation of a further polyurethane layer. After curing within a few seconds, the geotextile which forms the reservoir was filled with a 1 m high layer of fine sand. A barrier layer was applied to this, followed by a further 1 m high sand layer. This was followed by a further barrier layer and a pebbles layer 1 m in height. The final layer applied was a 0.5 m high layer of earth. The two 10 m long barrier layers were produced in accordance with the same method as the reservoir. Both barrier layers each contained on one side, 0.5 m in advance of the barrier layer end, 10 holes with a diameter of 10 cm at a spaced interval of 10 cm. The two barrier layers were introduced into the reservoir in such a manner that the holes were disposed opposite one another. Finally, a fountain 0.3 m wide and 4 m long was fitted into the reservoir. In the lower region it had 5 openings in the form of 10 cm long and 2 cm wide slots. Finally, the upper end of the fountain was connected to a suction pump.

The reservoir was then irrigated artificially with water.
Results:
Flow rate of the water: where possible low flow rate for particularly good purification results.
Pump output: very low pump output, as the water is urged from the bottom upwards.
Quality of the water: drinking water.

The invention claimed is:

1. A water management system for golf courses having an irrigation network (100), comprising:
at least first and second water-storage and water-purification systems (1), wherein, each water-storage and water-purification system (1) comprises:
(i) a substantially water-impermeable, artificial and outwardly delimited reservoir (2) which is filled at least partially by porous material (3);
(ii) a plurality of barrier layers (5) for extending the seepage path of the water, wherein the barrier layers (5) are disposed within the reservoir (2), and each of the barrier layers (5) is provided with at least one passage (6) for water that may be selectively opened and closed;
(iii) porous material (3) located above and below each of the barrier layers (5);
(iv) a cultivation layer (10) applied to the porous material (3) above the uppermost barrier layer (5); and
(v) a water-collecting container (4) which extends from the bottom of the reservoir (2) at least to a surface of the reservoir (2), wherein the water-collecting container (4) comprises an opening (7) above an uppermost barrier layer (5) and at least one opening (8) below a lowermost barrier layer (5), through which openings water can flow;
wherein the first water-storage and water-purification system (1) is a main system, and the second water-storage and water-purification system (1) is a secondary system (1b), and
wherein the main system (1a) and the secondary system (1b) are connected to each other by conduits (1c).

2. The system as claimed in claim 1, wherein the water-collecting container (4) further comprises openings (11), which are positioned at each barrier layer (5) for removing the water from the system (1).

3. The system as claimed in claim 2, wherein the at least one opening (8) and each of the further openings (11) are provided with a shutter adapted to open or close the respective opening (8, 11).

4. The system as claimed in claim 3, wherein a biochemical sensor for measuring concentrations of pesticides, fungicides, nutrients, fertilizers or the like is provided at each of the at least one opening (8) and the further openings (11).

5. The system as claimed in claim 4, further comprising a control unit for controlling the shutters to be opened or closed, respectively, in response to the measurement of at least one of the sensors.

6. The system as claimed in claim 1, wherein the water-collecting container (4) is connected via the opening (7) to a water-removal station (9).

7. The system as claimed in claim 6, wherein the water-removal station (9) is a pump station.

8. The system as claimed in claim 1, wherein the barrier layers (5) are disposed substantially horizontally within the reservoir (2).

9. The system as claimed in claim 8, wherein the passage (6) for water is disposed in an outer region of the respective barrier layer (5).

10. The system as claimed in claim 1, wherein the passage (6) for water is provided in the form of a slot or a hole.

11. The system as claimed in claim 1, wherein the passages (6) for water in adjacent barrier layers (5) are disposed in an offset manner with respect to each other.

12. The system as claimed in claim 1, wherein the passage (6) for water is provided with a shutter, which can be opened or closed.

13. The system as claimed in claim 1, wherein the reservoir (2) comprises a trough-shaped or hemispherical form.

14. The system as claimed in claim 1, wherein the porous material (3) is selected from gravel, pebbles, and sand, or mixtures thereof.

15. The system as claimed in claim 1, wherein the cultivation layer (10) is a golf course, a park, or a humus-containing layer.

16. The system as claimed in claim 1, wherein the harrier layers (5) and the reservoir (2) comprise a geotextile.

17. The system as claimed in claim 16, wherein the geotextile comprises;
(i) a layer of material, and
(ii) a polyurethane,
wherein the polyurethane substantially seals any cavities and intermediate spaces present in the layer.

18. The system as claimed in claim 17, wherein the polyurethane is formed by polymerization of a two-component system comprising:
(a) a polyol component, comprising a polyether polyol, a polyester polyol, propylene oxide homopolymer and pulverized molecular sieve; and
(b) an isocyanate component, comprising diphenylmethane-4,4'-diisocyanate.

19. The system as claimed in claim 17, wherein the polyurethane fills the cavities and intermediate spaces present in the layer of woven material or non-woven material in a watertight manner.

20. The system as claimed in claim 17, wherein the geotextile comprises a second layer of material, wherein any cavities and intermediate spaces present in the second layer of material are filled by the polyurethane and the first and second layers of material are adhered to each other by means of the polyurethane.

21. The system as claimed in claim 17, wherein the layer is a non woven material.

22. The system as claimed in claim 17, wherein the layer is a woven material.

23. The system as claimed in claim 20, wherein the outer surface of the first and second layer is coated with the polyurethane.

24. The system as claimed in claim 1, wherein the main system (1a) is positioned higher in respect to sea level than the secondary system (1b), preferably by a height difference of a range of 30 to 40 m.

25. The system as claimed in claim 24, further comprising at least one trench (13) connected to the secondary system (1b), wherein the at least one trench (13) is provided directly at the location which is to be irrigated.

26. The system as claimed in claim 25, further comprising a regulator (14) adapted to regulate the water level in the at least one trend (13) in respect to the secondary system (1b), to which it is connected.

27. The system as claimed in claim 25, wherein the trench (13) is filled with a porous material, preferably sand.

28. The system as claimed in claim 26, wherein the water provided to the trench can be controlled in terms of its water quality, preferably its concentration of pesticides, fungicides, fertilizer, and/or nutrients.

29. The system as claimed in claim 1, wherein water for irrigation purposes is stored in a range of 30 to 50 cm below the soil.

30. The system as claimed in claim 1, wherein the secondary system (1b) is located at lower positions in the landscape, preferably at troughs or ditches, in order to collect water from the surrounding terrain.

31. The system as claimed in claim 1, further comprising at least one water pocket connected to the secondary system (1b), wherein the at least one water pocket is provided closely below an area to be irrigated.

32. The system as claimed in claim 31, wherein the water pocket is filled with a porous material, preferably sand.

33. The system as claimed in claim 31, further comprising a regulator (14) adapted to regulate the water level in the at least one water pocket in respect to the secondary system (1b), to which it is connected.

34. The system as claimed in claim 32, wherein the sand-filled water pocket serves as drainage in order to prevent water from accumulating on the cultivation layer (10), preferably a golf course.

35. The system as claimed in claim 33, wherein the water provided to the water pocket can be controlled in terms of its water quality, preferably its concentration of pesticides, fungicides, fertilizer, and/or nutrients.

36. The system as claimed in claim 1, wherein the irrigation network (100) is connectable with residential areas, hotels, commerce and industry areas, or other water-consuming objects, preferably by conduits.

37. The system as claimed in claim 36, wherein the conduits can be connected to at least one of the reservoir (2), the main system (1a), or the secondary system (1b).

38. The system as claimed in claim 36, wherein each conduit comprises at least one supply conduit for supplying water from the surroundings to the system, and at least one discharge conduit for discharging the cleaned water from the system back to the surroundings.

* * * * *

UNITED STATES PATENT AND TRADEMARK OFFICE
CERTIFICATE OF CORRECTION

| | | |
|---|---|---|
| PATENT NO. | : 8,256,989 B2 | Page 1 of 1 |
| APPLICATION NO. | : 12/979238 | |
| DATED | : September 4, 2012 | |
| INVENTOR(S) | : Burkhardt et al. | |

It is certified that error appears in the above-identified patent and that said Letters Patent is hereby corrected as shown below:

| COLUMN | LINE | ERROR |
|---|---|---|
| (75) Title p. 1, col. 1 | Inventors | Following "Arthur Glanzmann," "Lucerne" should read --Luzern-- |

In the Claims

| COLUMN | LINE | ERROR |
|---|---|---|
| 16 | 43 | "harrier" should read --barrier-- |
| 16 | 44 | "harrier" should read --barrier-- |
| 17 | 29 | "harrier" should read --barrier-- |
| 17 | 57 | "non woven" should read --non-woven-- |
| 18 | 13 | "trend" should read --trench-- |

Signed and Sealed this
Fifth Day of November, 2013

Teresa Stanek Rea
*Deputy Director of the United States Patent and Trademark Office*